(12) United States Patent
Ishii

(10) Patent No.: US 8,538,090 B2
(45) Date of Patent: Sep. 17, 2013

(54) DEVICE FOR MANIPULATING VEHICLE BUILT-IN DEVICES

(75) Inventor: Kosei Ishii, Chiba (JP)

(73) Assignees: Hyundai Motor Japan R&D Center, Inc., Yokohama (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 767 days.

(21) Appl. No.: 12/554,844

(22) Filed: Sep. 4, 2009

(65) Prior Publication Data

US 2010/0226539 A1   Sep. 9, 2010

(30) Foreign Application Priority Data

Mar. 3, 2009   (JP) ................................ 2009-049279

(51) Int. Cl.
*G06K 9/00*   (2006.01)

(52) U.S. Cl.
USPC ......................................... 382/116; 382/104

(58) Field of Classification Search
None
See application file for complete search history.

(56) References Cited

U.S. PATENT DOCUMENTS

| | | | | |
|---|---|---|---|---|
| 2003/0048260 | A1* | 3/2003 | Matusis | 345/173 |
| 2005/0083310 | A1* | 4/2005 | Safai et al. | 345/173 |
| 2005/0110768 | A1* | 5/2005 | Marriott et al. | 345/173 |
| 2006/0026521 | A1* | 2/2006 | Hotelling et al. | 715/702 |
| 2007/0052686 | A1* | 3/2007 | Nomura | 345/173 |
| 2007/0097089 | A1* | 5/2007 | Battles | 345/173 |
| 2007/0188474 | A1* | 8/2007 | Zaborowski | 345/173 |

FOREIGN PATENT DOCUMENTS

| | | |
|---|---|---|
| JP | 1998-269012 | 10/1998 |
| JP | 2001-216069 | 8/2001 |
| JP | 2004-206206 A | 7/2004 |
| JP | 2005-352927 A | 12/2005 |
| JP | 2007-272596 A | 10/2007 |
| JP | 2007-304646 A | 11/2007 |
| KR | 10-0654086 | 11/2006 |
| KR | 10-2008-0072205 | 8/2008 |

* cited by examiner

*Primary Examiner* — David Zarka
*Assistant Examiner* — Jhere Rowland
(74) *Attorney, Agent, or Firm* — Edwards Wildman Palmer LLP; Peter F. Corless

(57) ABSTRACT

The present invention provides a device for manipulating vehicle built-in devices. The device includes a manipulation unit, a display unit and a manipulation control unit.

13 Claims, 11 Drawing Sheets

| Manipulation example of finger | Motion of finger | Manipulation instruction | Application example |
|---|---|---|---|
| Example 1 | Motion of extending flexed finger or flexing extended finger | Expand or reduce | Expansion or reduction of map on manipulation screen of car navigation system |
| Example 2 | Motion of making flip using two fingers | Cancel (or return) | Instruction to cancel on each manipulation |
| Example 3 | Motion of drawing character, symbol or number using tip of finger | Example: if 'A', press AUTO button | Presentation of manipulation buttons on manipulation screen using characters, and instructions using drawn characters |
| Example 4 | Motion of double touching pad unit using finger | Click | Issuance of instruction indicative of click on manipulation button on manipulation screen |

FIG.6

| Extent of force exerted on finger | Pressing load | Details of manipulation |
|---|---|---|
| Example 1 | equal to or weaker than 1 N | Touch manipulation of bringing tip of finger into light contact with pad unit |
| Example 2 | 1 N to 2 N | Push manipulation detected by pressure sensor |
| Example 3 | 2 N to 3 N | Strong push manipulation detected by load sensor. For example, used to display menu screen of vehicular device on display unit |
| Example 4 | equal to or stronger than 3 N | Stronger push manipulation detected by load sensor. For example, used to display map of current location on display unit |

FIG.11

DEVICE FOR MANIPULATING VEHICLE BUILT-IN DEVICES

CROSS-REFERENCE TO RELATED APPLICATION

This application claims under 35 U.S.C. §119(a) the benefit of Japanese Patent Application No. 2009-049279 filed on Mar. 3, 2009, the entire contents of which are incorporated herein by reference.

BACKGROUND (a) Technical Field

The present invention relates to a device for manipulating vehicle built-in devices. More particularly, the invention relates to a manipulation device capable of issuing instructions to vehicle built-in devices using diagrams that are preferably drawn by a finger on the surface of a pad unit through the motion of a hand.

(b) Background Art

A manipulation device which includes a manipulation unit disposed in a center console near the shift lever of a vehicle and a display unit disposed on an instrument panel away from the manipulation unit are well known in the art. According to this manipulation device, when a hand placed on the manipulation unit is suitably photographed, a captured image of the hand is displayed on the manipulation screen of a vehicular device displayed on the display unit Japanese Unexamined Patent Publication No. Hei 10-269012, incorporated by reference in its entirety herein, is directed to, a touch panel that is installed in a manipulation unit. According to the 10-269012 publication, when the touch panel is pressed with a finger by moving the finger so that the finger is overlaid on a manipulation button displayed on the manipulation screen, a manipulation instruction corresponding to the manipulation button on which the finger has been overlaid is suitably issued. According to preferred embodiments of Korean Unexamined Patent Publication No. 2001-216069, incorporated by reference in its entirety herein, a touch panel is not suitably provided in a manipulation unit. Instead, according to the 2001-216069 publication, a hand's gestures, such as ┌scissors┘, ┌rock┘ and ┌paper┘, are photographed using a camera and suitably corresponding manipulation instructions are issued.

However, the manipulation of overlaying a finger on a desired manipulation button while viewing a manipulation screen, for example as set forth in the 10-269012 publication, may suitably impede driving, where the driver has to suitably turn his eyes to the manipulation screen. Further, the recognition of a hand's gestures, for example as set forth in the 2001-216069 publication, does not necessarily suitably associate, for example, the gesture ┌rock┘ with the manipulation for the increase in volume, and further, related gestures are difficult to remember.

Accordingly, a manipulation using, for example, a finger's trajectories, that is capable of indicating the details of manipulation, rather than the manipulation of selecting and pressing manipulation buttons, is more desirable for manipulation of many features on a manipulation screen, for example, but not limited to, the expansion and reduction of a map on a car navigation manipulation screen, manipulation for the increase and decrease in volume on an audio manipulation screen.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention features a device for manipulating vehicle built-in devices which is suitably convenient for use and which is capable of suitably detecting the motions of a finger in contact with the surface of a pad unit and issuing relevant manipulation instructions.

In one aspect, the present invention provides a device for manipulating vehicle built-in devices, including a manipulation unit that preferably includes a pad unit configured to come into contact with a user's hand and a camera configured to photograph the user's hand; a display unit for displaying images of at least one user's finger captured by the camera while overlaying on a manipulation screen of a vehicular device; and a manipulation control unit for issuing a relevant manipulation instruction by comparing a motion of the user's hand input through the pad unit of the manipulation unit with motion patterns previously registered in memory.

In a preferred embodiment, the manipulation unit further includes an illumination unit for emitting light to the user's hand in order to suitably improve recognizing performance of the camera.

In another preferred embodiment, the manipulation control unit compares a trajectory drawn by a tip of the finger in contact with a surface of the pad unit, which is suitably acquired from time series images of the user's finger captured using the camera with the motion patterns previously registered in the memory.

In still another preferred embodiment, the manipulation control unit issues a manipulation instruction corresponding to the motion pattern to a relevant vehicular device if the trajectory drawn by a tip of the finger is consistent with the motion pattern previously registered in memory.

In yet another preferred embodiment, the manipulation control unit issues an instruction indicative of an amount of manipulation depending on a length of a trajectory preferably drawn by a tip of the finger in contact with a surface of the pad unit, which is suitably acquired from images of the user's finger captured by the camera.

In still yet another preferred embodiment, the trajectory is preferably detected as a trajectory of a white portion of a tip of the finger that is presented in images of the user's finger captured by the camera when the tip of the user's finger is suitably brought into contact with the pad unit.

In a further preferred embodiment, the trajectory is preferably drawn by a gesture of the hand.

In another further preferred embodiment, the gesture of the hand includes, but is not limited to, at least one of a motion of extending a flexed finger with a tip of the finger in contact with the pad unit, a motion of flexing an extended finger with a tip of the finger in contact with the pad unit, a motion of making a flip using two fingers with the fingers simultaneously in contact with the pad unit, a motion of directly drawing a character using a finger, and a double touch motion of bringing a tip of a finger into light contact with the pad unit twice, and a motion pattern consistent with the trajectory is registered in memory of the manipulation control unit so that a manipulation instruction corresponding to a motion based on the trajectory can be output.

In still another further preferred embodiment, the pad unit is preferably provided with a pressure sensor which is transparent and suitably detects a pressing location of the finger in coordinate form.

In yet another further preferred embodiment, the pad unit is further provided with a load sensor which is transparent and can suitably detect a stronger pressing pressure than the pressure sensor.

Other aspects and preferred embodiments of the invention are discussed infra.

According to the device for manipulating vehicle built-in devices according to the present invention, the manipulation control unit for comparing a trajectory drawn by the tips of one or more fingers in contact with the surface of the pad unit with motion patterns previously registered in memory and issuing a manipulation instruction corresponding to the trajectory to a vehicular device is preferably provided, so that the manipulation of overlaying a finger on a manipulation button displayed on the manipulation screen is not suitably required, and efficient manipulation without inconvenience can be suitably performed.

For example, in a preferred embodiment of the invention, an instruction to increase volume may be preferably given using the linear trajectory of a finger that suitably extends from below to above, and an instruction to reduce volume may be preferably given using the linear trajectory of a finger that suitably extends from above to below. Preferably, a manipulation button corresponding to a number may be selected from among a plurality of manipulation buttons by drawing the number using a finger. In preferred embodiments, it is not necessary to overlay a finger on a displayed manipulation button and a manipulation instruction can be suitably given regardless of the location of a finger on a manipulation screen. Accordingly, it is preferably not necessary to view a manipulation screen so as to check the location of a finger, and safe driving is possible even in the case of manipulation during driving.

According to preferred embodiments of the invention, since white portions resulting from the contact of a finger with the pad unit are suitably extracted from captured images and the trajectory of the white portions is suitably detected using coordinates, the motion of the tip of the finger can be suitably detected faster than if the motion of the tip of a finger is detected based on the motion of the entire hand.

Preferably, since trajectories that are suitably drawn by bringing one or more fingers in contact with the pad unit and making hand's gestures, for example, hand motions, are preferably used, a user can easily remember the suitable manipulation.

In preferred embodiments, the pad unit is provided with the pressure sensor, and the push manipulation of pressing the pressure sensor may be preferably employed, in addition to the touch manipulation of, for example, bringing a finger into contact with the pad unit and suitably drawing a diagram. Accordingly, distinguishing between touch manipulation and push manipulation may be suitably performed using the pressing pressure of a finger. Preferably, push manipulation is the manipulation of suitably overlaying and pressing the tip of a finger on a manipulation button of a manipulation screen, and is suitably effective in the case of performing manipulation while viewing a display device, for example as in initial setting that is performed before driving a vehicle.

In certain cases where the pad unit is provided with a load sensor capable of detecting a stronger pressing pressure than a pressure sensor in addition to the pressure sensor, when push manipulation using a pressing pressure stronger than that for the pressure sensor is performed, this manipulation can be suitably detected using the load sensor and a manipulation instruction suitably different from the instruction that is preferably given when the pressure sensor detects a pressure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 5A is an image showing that the finger is in contact with the pad unit 3, and FIG. 5B is an image showing that the tip of the finger is not suitably in contact with the pad unit 3;

FIG. 6 is a table illustrating the touch manipulation of a finger according to preferred embodiments of the present invention;

FIG. 11 is a diagram illustrating examples of the manipulation of FIG. 10.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a device for manipulating vehicle built-in devices, comprising a manipulation unit, a display unit, and a manipulation control unit.

In one embodiment, the manipulation unit comprises a pad unit and a camera.

In another embodiment, the pad unit is configured to come into contact with a user's manipulating hand and the camera is configured to photograph the user's hand.

In another related embodiment, the display unit displays images of at least one user's finger captured by a camera while overlaying on a manipulation screen of a vehicular device.

In a further embodiment, the manipulation control unit issues a relevant manipulation instruction by comparing a motion of the user's hand input through a pad unit of the manipulation unit with motion patterns previously registered in memory.

Also featured in the present invention is a motor vehicle comprising the device for manipulating vehicle built-in devices as described in any of the aspects herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A device for manipulating vehicle built-in devices according to preferred embodiments of the present invention will be described in detail below with reference to the accompanying drawings.

Figure 1:
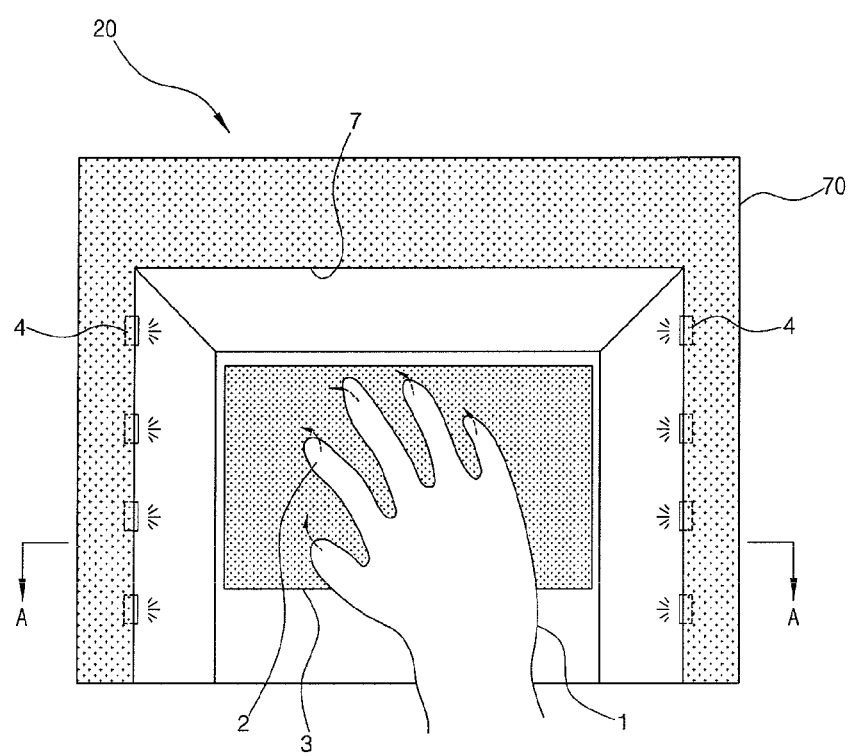
FIG. 1 is a plan view showing the manipulation unit of a manipulation device according to the present invention.

FIG. 1 is an exemplary plan view showing the manipulation unit of the manipulation device according to preferred embodiments of the present invention. As shown in FIG. 1, the manipulation unit 20 of the manipulation device is suitably mounted on a center console 70 in which a shift lever is suitably disposed. Preferably, a depression 7 provided with an illumination unit 4 on the inside thereof and suitably provided with a pad unit 3, with which a hand of a manipulator (a user including a driver) comes into contact, on the bottom thereof is formed in the manipulation unit 20. In further embodiments, the manipulator's hand 1 placed on a palm rest is inserted into the depression 7 from the lower side of FIG. 1. Preferably, the manipulator performs manipulation by bringing a hand, more definitely a finger 2, into contact with the pad unit 3.

Figure 2:
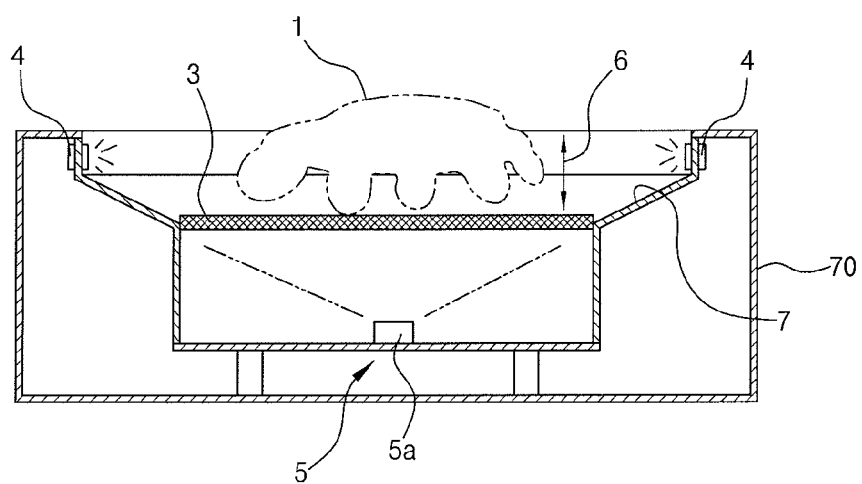
FIG. 2 is a sectional view taken along line A-A of FIG. 1.

As shown in another further embodiment, FIG. 2 is a sectional view taken along line A-A of FIG. 1. Preferably, an infrared camera may be used as the camera 5a of a photographing unit 5 for suitably photographing the manipulator's hand. Preferably, the camera 5a is suitably installed in the lower portion of the pad unit 3, and photographs the hand 1 from a location suitably below the hand 1. The illumination unit 4 may preferably be installed to improve the capturing performance of the camera 5a. Preferably, infrared lamps may be used as the lamps of the illumination unit 4. Suitably, an infrared lamp is not affected by the presence of indoor light, and preferably enables a clear image of the contour of the finger 2 to be captured. Preferably, since the depression 7 is provided, walls are formed around the depression 7, so that a photographing region 6 can be suitably limited to the range shown in FIG. 2 by the adjustment of the depth of field of the camera 5a and the walls, with the result that there is no concern about capturing of objects other than the hand. Preferably, the view angle or focus of the camera 5a is set in harmony with the photographing region. Preferably, when such infrared camera and infrared lamps are suitably employed, the vein pattern of the hand 1 or finger 2 may be checked and be then used for biometric authentication. In further embodiments, the driver's pulse may be detected and be used for the driver's health check.

Figure 3:
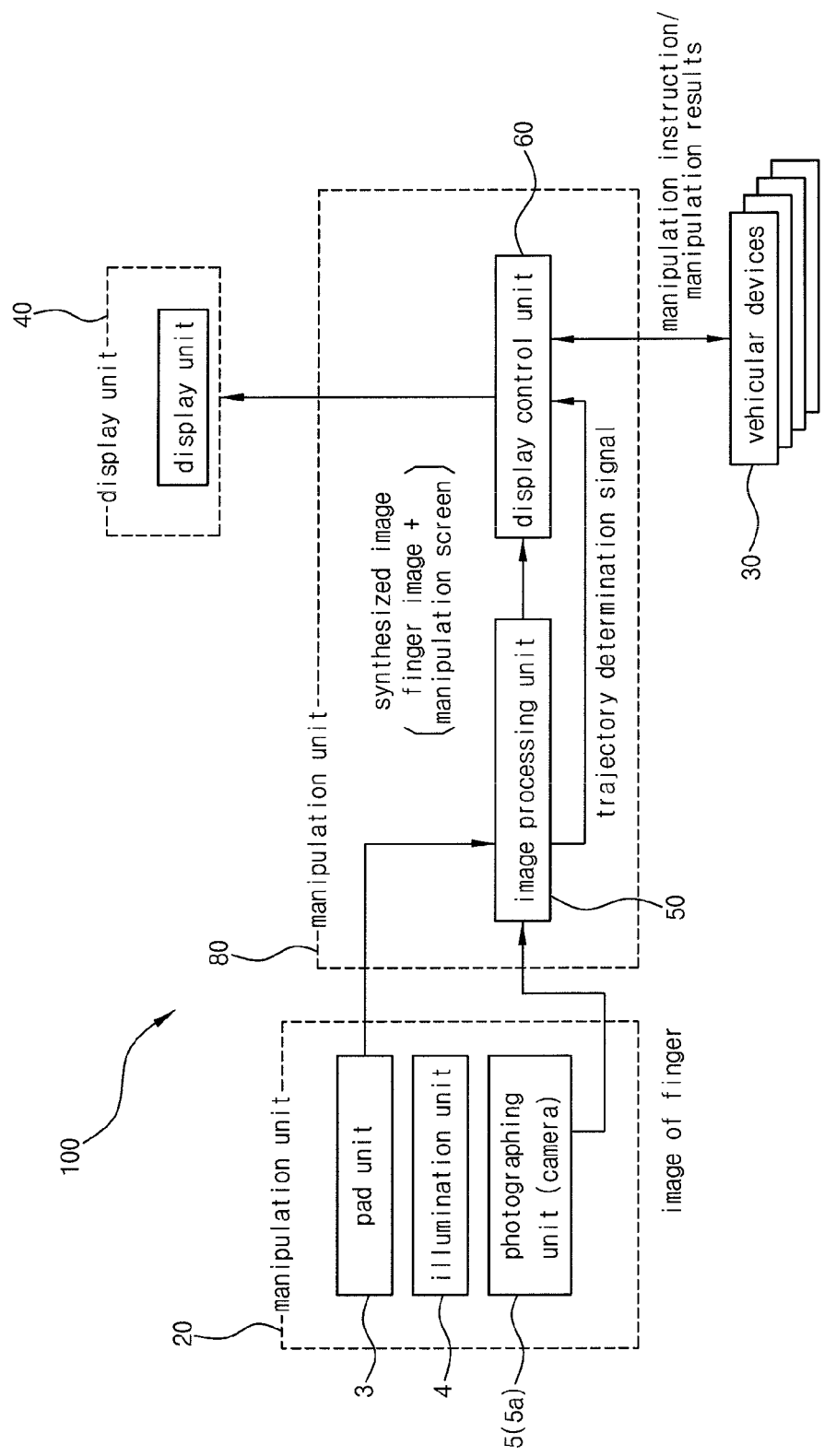
FIG. 3 is a block diagram showing the manipulation device according to preferred embodiments of the present invention.

Preferably, FIG. 3 is a block diagram showing the manipulation device according to preferred embodiments of the present invention. Preferably, the manipulation device 100 includes a manipulation unit 20 that includes the pad unit 3 for coming into contact with the user's manipulating hand and the camera 5a for photographing the user's hand, a display unit 40 for displaying an image of the user finger, captured by the camera 5a, on a manipulation screen for the manipulation of the vehicle built-in devices 30, and a manipulation control unit 80 preferably for comparing the motion of the user's hand input through the pad unit 3 of the manipulation unit 20 with the previously registered motion patterns of memory and suitably issuing a relevant manipulation instruction. In further preferred embodiments, the illumination unit for increasing the capturing performance of the camera may preferably be added.

The vehicle built-in devices 30 are suitably connected to the manipulation device 100, so that the vehicle built-in devices 30 can be manipulated using the manipulation device 100. The vehicle built-in devices 30 include, but are not necessarily limited to, an air conditioner, a navigation system and a car audio system. Preferably, the manipulation of the vehicle built-in devices 30 includes, for example, the control of the temperature of an air conditioner and the control of the volume of an audio system. According to other preferred embodiments, a menu screen for selecting a vehicular device to be manipulated and a manipulation screen for displaying the various manipulation buttons of a selected vehicular device are suitably displayed on the display unit 40. Preferably, the manipulation control unit 80 includes an image processing unit 50 and a display control unit 60. In related embodiments, the display control unit 60 suitably overlays and displays an image of the finger input from the camera 5a on the manipulation screen of the display unit 40.

According to other preferred embodiments, and as shown in FIG. 3, the display control unit 60 selects, for example, a manipulation screen for an air conditioner, which is one of the vehicle built-in devices 30, and suitably displays it on the display unit 40. The selection of a vehicular device is preferably performed using the selection button of the vehicular device displayed on the menu screen. Preferably, the pad unit 3 may have a construction having no manipulation switches or a construction having suitably manipulation switches (for example, but not limited to, pressure sensors), the details of which will be described below with reference to FIGS. 8 to 10.

For example, in the manipulation control unit 80 of FIG. 3, the image processing unit 50 suitably functions to compare a trajectory acquired from a time series of images of at least one finger suitably captured by the camera 5a of the photographing unit 5 and drawn by the tip of the finger located in contact with the surface of the pad unit, with motion patterns previously registered in memory, and, if the trajectory drawn by the tip of the finger is consistent with a motion pattern previously registered in the memory, provide a notice to the display control unit 60. Accordingly, the display control unit 60 can issue a suitable instruction to perform predetermined manipulation corresponding to the motion pattern to the selected vehicular device.

Figure 4:
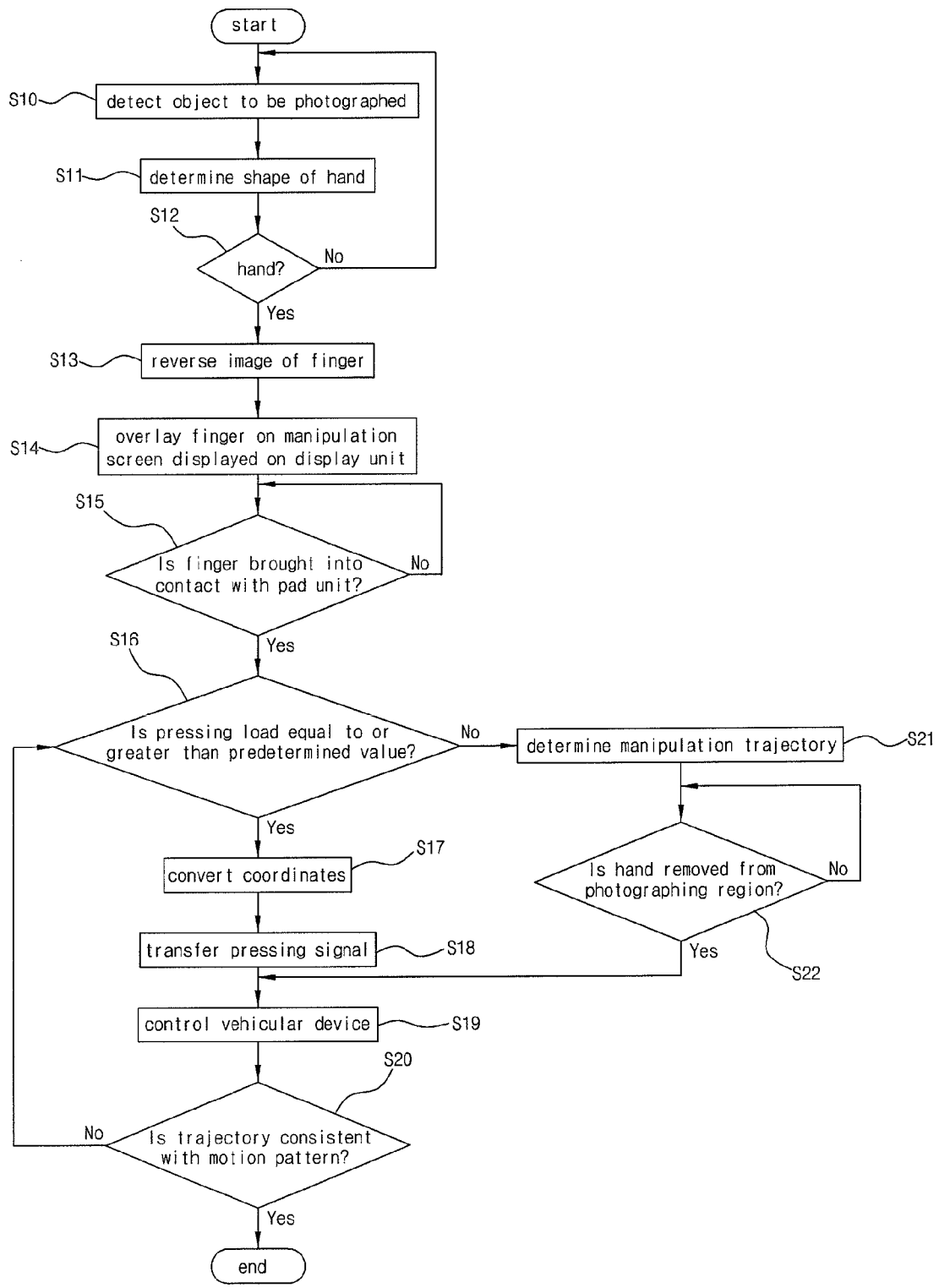
FIG. 4 is a flowchart showing the control of the manipulation device according to preferred embodiments of the present invention.

FIG. 4 is a flowchart showing the control of the manipulation device according to further preferred embodiments of the present invention. At step S10, an object entering the photographing region 6 of the manipulation unit 20 is suitably photographed using the camera 5a of the photographing unit 5. Accordingly, whether the photographed object is a hand is suitably determined through hand shape pattern matching at steps S11 and S12, and in further related embodiments, the process proceeds to a subsequent step. Preferably, the object that is determined not to be a hand is not displayed. In further embodiments, at step S13, an image of the finger to be overlaid on the manipulation screen of the vehicular device is suitably converted into an image viewed from above (from the back of the hand) (an image viewed from above to below). Since the image of the finger acquired by the camera 5a from below is a reversed image, image reversing is performed through image processing. At step S14, after the image reversing has been suitably performed, the image of the finger is overlaid on the manipulation screen of the vehicular device. Accordingly, If the size of the pad unit 3, which is a photographing window, is suitably different from that of the display unit, the size of the image of the finger is preferably changed. At step S15, whether the manipulating finger 2 has come into contact with the pad unit 3 is suitably determined.

In further preferred embodiments of the invention, at steps S16, S21 and S22 of FIG. 4, the pad unit 3 is preferably touched with a weak force of, for example, but not limited to, 0.5 N, a trajectory suitably formed by the finger 2 is extracted from a time series of images of the finger 2 captured by the camera 5a, and a relevant manipulation instruction is preferably issued if the trajectory is consistent with a motion pattern previously registered in memory. Preferably, this is performed by touch manipulation. Touch manipulation does not require a strong finger force, and can be suitably performed through a light touch. In further preferred embodiments, at steps S17, S18 and S19 of FIG. 4, a manipulation instruction is suitably issued by the finger 2 pressing a pressure sensor. Preferably, this is performed by push manipulation. Whether the manipulator intends to perform touch manipulation or push manipulation may be suitably determined based on the value of the pressing load of the finger 2, as indicated at step S16.

Accordingly, at step S16, whether the intended manipulation is touch manipulation or push manipulation is preferably determined using the value of the pressing load. Steps S17 to S19 correspond to the case where a pressing load equal to or higher than a predetermined value is suitably detected. If the pressure sensor operates and a pressing signal and pressing coordinates are suitably acquired through the pressure sensor, the instruction of a relevant manipulation button on the manipulation screen is issued. According to further preferred embodiments, steps S21 and S22 correspond to the case where the pressing load is suitably low and the intended manipulation is determined not to be push manipulation. In this case, the trajectory of the tip of the finger 2 is suitably detected. Accordingly, if the trajectory of the finger is consistent with a motion pattern previously registered in memory, the image processing unit 50 suitably notifies the display control unit 60 of the consistency in the form of a control signal. Touch manipulation is to bring the finger 2 into contact with the surface of the pad unit 3 and move the finger 2 on the surface of the pad unit 3. The type of touch manipulation is preferably determined by detecting the trajectory of the white portion 2a, for example, the center, of the finger 2 in contact with the pad unit 3 in the form of coordinates and performing matching with a motion pattern previously registered in memory. Preferably, manipulation instructions to be issued are previously registered in association with relevant motion patterns.

Figure 5:
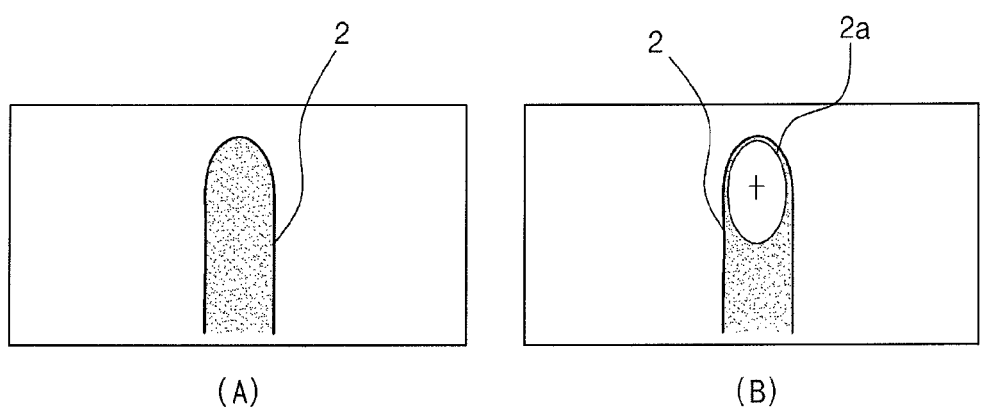
FIG. 5 is an image of the finger captured by the camera of FIG. 2.

According to further preferred embodiments of the invention, and as shown in FIG. 5, FIG. 5 is an image of the finger suitably captured by the camera of FIG. 2. As shown in FIG. 5, the finger 2 preferably comes into contact with the pad unit (indicated by reference numeral 3 in FIG. 2), an image of a contact portion is captured in white. At S15, if the white portion 2a is preferably present in an image, the finger 2 is suitably determined to come into contact. Preferably, the tip of the finger in contact with the pad unit 3 is suitably recognized as the white portion 2a. FIG. 5A is an image showing that the finger is in contact with the pad unit 3, and FIG. 5B is an image showing that the tip of the finger is not in contact with the pad unit 3.

FIG. 6 is a table illustrating a finger's touch manipulation according to certain preferred embodiments of the present invention as described herein. Preferably, touch manipulation may be performed by one of the finger's motions indicated in manipulation examples 1 to 4. According to preferred exemplary embodiments, manipulation example 1 corresponds to a gesture of bringing the tip of a finger into contact with the pad unit and suitably extending the flexed finger or suitably flexing the extended finger. Preferably, this may be used for, for example, but not limited to, an instruction to expand or reduce the map of a car navigation system. Manipulation example 2 corresponds to a gesture of simultaneously bringing the tips of two fingers in contact with the pad unit and making a flip. This may be used, for example, for the cancellation of a manipulation screen. Manipulation example 3 corresponds to a character drawing gesture, for example, of directly drawing a character (including a symbol and a number) with the finger 2. Preferably, a specific character or number is suitably indicated on each manipulation button displayed on the manipulation screen, and a relevant manipulation instruction is preferably issued to a vehicular device when the character or number is suitably drawn by the finger 2. According to further preferred embodiments of the invention, manipulation examples 1 to 3 do not require that a finger be suitably overlaid on a manipulation button of the manipulation screen, and allow a finger to move in any area of the pad unit of the manipulation unit. Manipulation example 4 corresponds to a double touch gesture of bringing the tip of a finger into contact with the pad unit twice. Preferably, a double touch is suitably performed by drawing points using the tip of a finger, rather than drawing a linear trajectory. Preferably, a double touch may be suitably detected by detecting the consistencies of two drawn points with a motion pattern of the tip of the finger previously registered in the memory. Accordingly, since a double-touched coordinate location can preferably be specified based on images from the camera, a double touch can be used as click manipulation for a manipulation button suitably disposed on the manipulation screen. Preferably, a double touch enables the manipulation of overlaying and pressing the tip of a finger on a manipulation button of the manipulation screen to be suitably detected without requiring a pressure sensor. According to preferred embodiment of the invention as described herein, by using touch manipulation, for example such as those shown in Manipulation Examples 1 to 4, manipulation can be suitably transferred without pressing the pad unit with strong force. In further preferred embodiments, an instruction indicative of the amount of manipulation can be preferably provided based on the length of a drawn trajectory.

Figure 7:
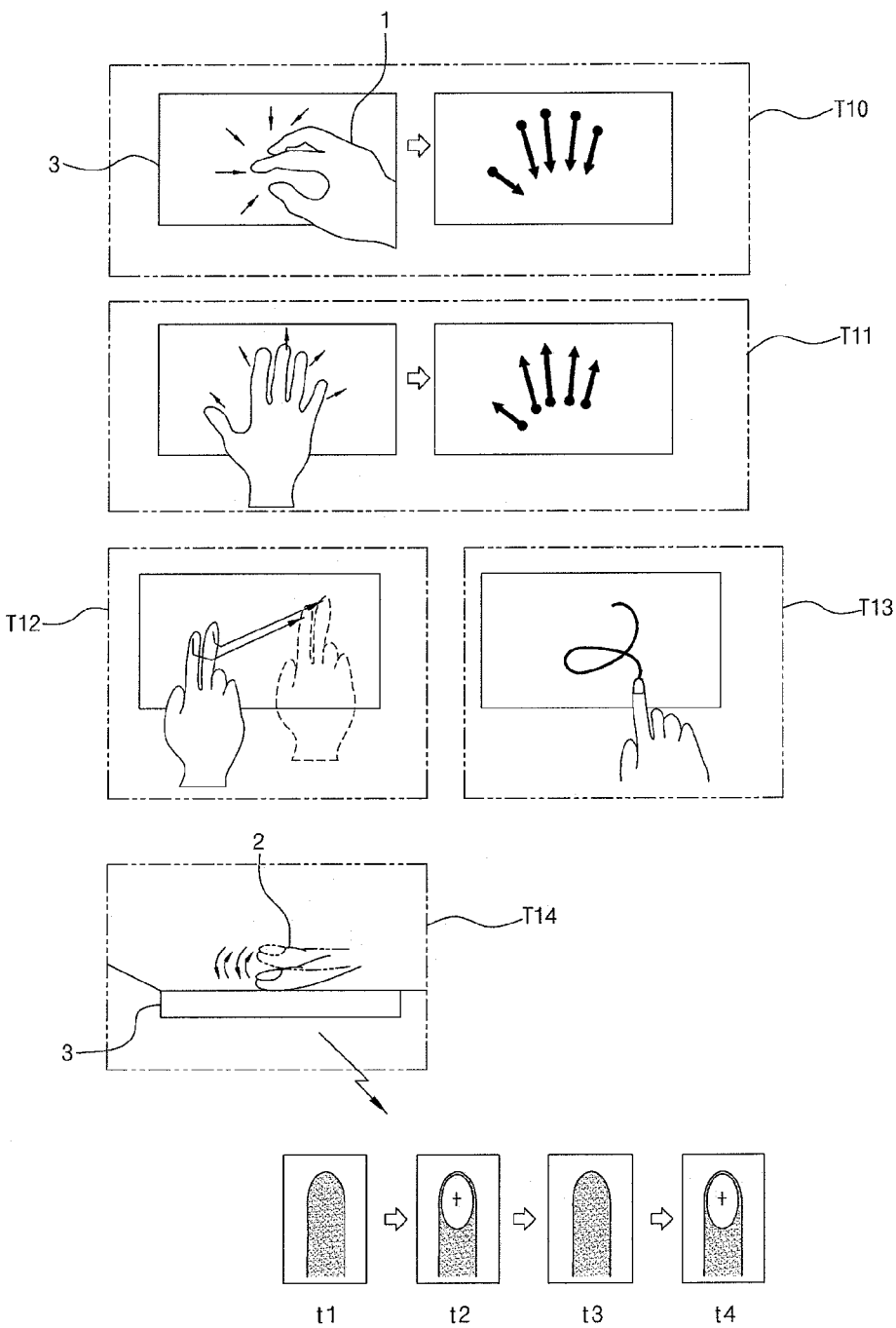
FIG. 7 is a diagram showing examples of a method of moving a finger in touch manipulation according to preferred embodiments of the present invention.

FIG. 7 is a diagram showing preferred examples of a method of moving a finger in touch manipulation. In certain examples, for example where an instruction to expand or reduce a map is preferably given, the instruction may be suitably issued by extending flexed fingers or flexing extended fingers, for example as shown by T10 and T11 (corresponding to Manipulation Example 1 of FIG. 6). Further, as this type of gesture is consistent with the details of manipulation, it is easy to remember. Accordingly, the trajectory of the tips of the fingers 2 preferably forms a pattern in which the trajectory of the fingers 2 is suitably extended from the center to the outside or concentrated from the outside to the center, and accordingly determination is possible. In further preferred embodiments, as shown by T12 (corresponding to Manipulation Example 2 of FIG. 6), the manipulation 'cancellation (return)' may be preferably performed using a suitable gesture of making a flip using two fingers. In other further preferred embodiments, as shown by T13 (corresponding to Manipulation Example 3 of FIG. 6), in character recognition, a character is preferably recognized by the character suitably drawn by the finger 2. Preferably, the blind manipulation of inputting a character without viewing the manipulation unit 20 may be performed. According to further preferred embodiments, T14 (corresponding to Manipulation Example 4 of FIG. 6) shows a double touch in which the tip of the finger 2 is brought in contact with the surface of the pad unit 3 twice. Preferably, such a double touch may be suitably detected by two occurrences of the white portion of the finger 2 at the same location during a period from t1 to t4.

Figure 8:
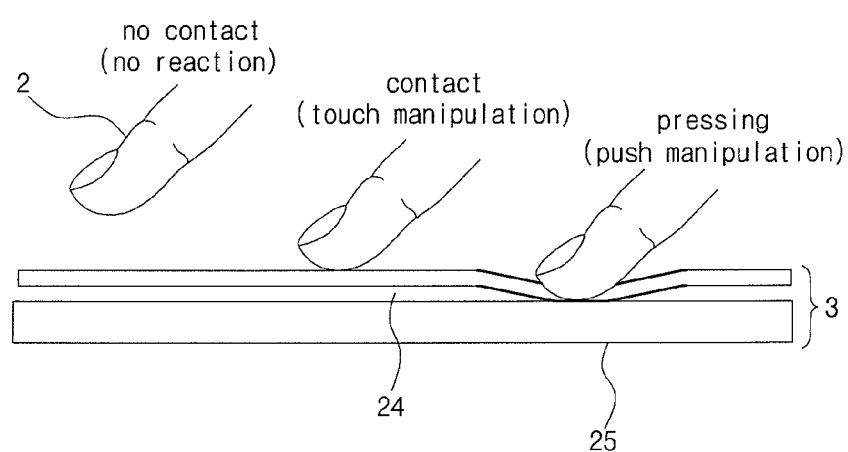
FIG. 8 shows an example in which the pad unit of FIG. 1 is formed of a transparent seat and a glass plate.
Figure 9:
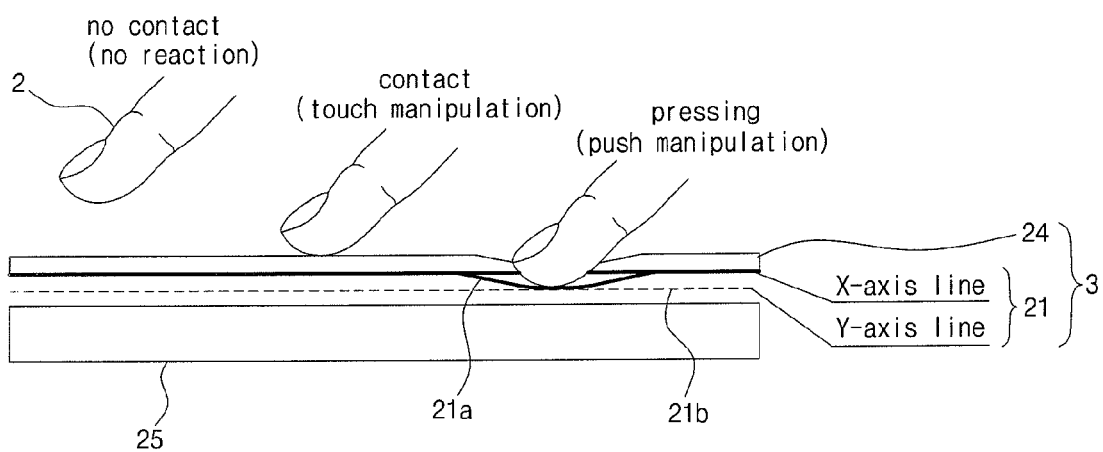
FIG. 9 shows an example in which the pad unit of FIG. 1 is provided with a transparent pressure sensor.
Figure 10:
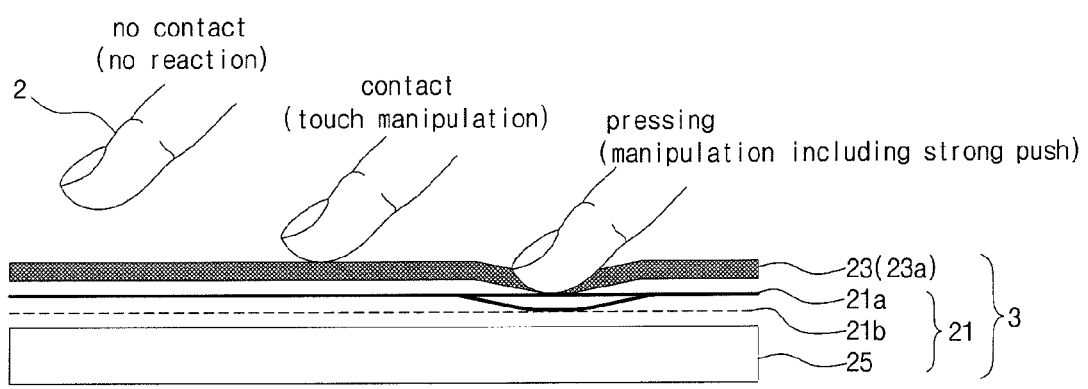
FIG. 10 shows an example in which the pad unit of FIG. 1 is provided with a transparent pressure sensor and a transparent sensor.

FIGS. 8 to 10 are diagrams showing examples of the construction of the pad unit according to preferred embodiments of the present invention. FIG. 8 shows an example in which the pad unit 3 is preferably formed of a transparent seat 24 and a glass plate 25. FIG. 9 shows an example in which the pad unit 3 is suitably provided with a transparent pressure sensor 21. In certain preferred embodiments, instead of the pressure sensor 21, a plurality of mechanical switches may be suitably provided. FIG. 10 shows an example in which the pad unit 3 is suitably provided with a transparent pressure sensor 21 and a transparent seat-shaped load sensor.

In FIG. 8, the pad unit 3 is preferably formed of the transparent seat 24 and the glass plate 25, and accordingly, instructions are suitably issued by the touch manipulation of the finger 2. In certain cases, push manipulation performed by pressing the pad unit 3 with the finger 2 shown in FIG. 8 causes the area of the white portion 2a of the finger 2 to be suitably larger than that in the case of touch manipulation, the image processing unit 50 does not distinguish push manipulation and touch manipulation from each other. Accordingly, in the construction of FIG. 8, the determination at step S16 of FIG. 4 may be suitably performed and thus preferably determining 'double touch?'. Preferably, if Yes is suitably determined at step S16, a manipulation instruction corresponding to the manipulation button of a manipulation screen on which the finger 2 is overlaid may be issued at steps S17 to S19. Preferably, manipulation identical to push manipulation is suitably performed by double touch. The location of double touch can be calculated from the white portion 2a of the finger 2. In other preferred embodiments, if No is suitably determined at step S16, a motion in question is a gesture motion or a character drawing motion shown in Example 1, 2 or 3 of FIG. 6, and preferably the process branches to step S21 of FIG. 4, and a trajectory drawn on the pad unit 3 by the finger 2 is suitably determined. In further preferred embodiments, push manipulation and touch manipulation may preferably be distinguished from each other using the property that color suitably varies according to the extent of pressure exerted on the seat 24.

According to further embodiments of the invention, FIG. 9 shows an example in which the pad unit 3 is preferably provided with a pressure sensor 21. Both touch manipulation and push manipulation may be suitably used for the manipulation of the pad unit 3. Preferably, push manipulation is used to suitably manipulate the manipulation buttons of a manipulation screen. Accordingly, in further preferred embodiments of the invention, the determination at step S16 of FIG. 4 is preferably performed by suitably determining, for example, 'Is a pressing load equal to or higher than a predetermined load?'. In preferred embodiments, a double touch is not push manipulation, so that the process branches to step S21 and the double touch is then processed. In further embodiments, if a double touch is supported, a manipulation instruction corresponding to a manipulation button can be issued by any of a double touch and push manipulation. In other further embodiments, if the process branches to step S21, the details of touch manipulation based on the finger's trajectory are suitably interpreted. Preferably, the pressure sensor 21 includes X-axis sensors 21a and Y-axis sensors 21b. According to preferred embodiments of the invention, when a predetermined pressure is applied, a coordinate location pressed by the finger is suitably detected using the electrical conduction of a specific line that belongs to a plurality of row and column lines.

FIG. 10 shows an exemplary embodiment of the invention in which the pad unit 3 is preferably provided with the pressure sensor 21 and the load sensor 23. Preferably, a Piezo element may be used as the load sensor 23. In certain embodiments, both touch manipulation and push manipulation may be suitably used for the manipulation of the pad unit 3. Preferably, push manipulation includes push manipulation with a heavy pressing pressure and push manipulation at the level at which the pressure sensor 21 suitably operates.

FIG. 11 is a diagram illustrating examples of the manipulation of FIG. 10. According to preferred embodiments of the invention and as shown in FIG. 11, the number of types of manipulation can be suitably increased based on the pressing load even in the case where the same push manipulation is used.

As described herein, he present invention can be applied to a device for manipulating vehicle built-in devices. The present invention enables manipulation instructions to be suitably issued using touch manipulation including, but not limited to, for example, gestures.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for manipulating vehicle built-in devices, comprising:
   a pad configured to come into contact with a user's manipulating hand, the pad formed in a depression so that walls are formed around the depression;
   a camera installed beneath the pad and configured to photograph the user's fingers on the pad above;
   a screen configured to display overlay images of at least one user finger captured by the camera overlaid on a manipulation screen of a vehicular device; and a processor configured to issue a relevant manipulation instruction by extracting a trajectory formed by the user's fingers from a time series of images of at least one user's finger captured by the camera and comparing a motion pattern of the user's fingers input through the pad and the camera with motion patterns previously registered in memory, wherein each motion pattern is associated with a specific control function of the vehicle built-in devices, and wherein images taken of the user's fingers from below are converted into an image viewed from the bottom so that the image displayed on the screen is a top-side view of the user's fingers rather than a bottom side.

2. The device as set forth in claim 1, further comprising an illumination unit configured to emit light to the user's hand in order to improve recognizing performance of the camera.

3. The device as set forth in claim 1, processor compares a trajectory drawn by a tip of the finger in contact with a surface of the pad, which is acquired from time series images of the user's finger captured by the camera, with the motion patterns previously registered in the memory.

4. The device as set forth in claim 1, wherein the processor issues an instruction indicative of an amount of manipulation depending on a length of a trajectory drawn by a tip of the finger in contact with a surface of the pad, which is acquired from images of the user's finger captured by the camera.

5. The device as set forth in claim 1, wherein the pad is provided with a pressure sensor which is transparent and detects a pressing location of the finger in coordinate form.

6. The device as set forth in claim 1, wherein the camera is an infrared camera and the illumination unit.

7. The device as set forth in claim 2, wherein the illumination unit is made up of a plurality of infrared lamps.

8. The device as set forth in claim 3, wherein the manipulation control unit processor issues a manipulation instruction corresponding to the motion pattern to a relevant vehicular device if the trajectory drawn by a tip of the finger is consistent with the motion pattern previously registered in memory.

9. The device as set forth in claim 3, wherein the trajectory is detected as a trajectory of a white portion of a tip of the finger that is presented in images of the user's finger captured by the camera when the tip of the user's finger is brought into contact with the pad.

10. The device as set forth in claim 3, wherein the trajectory is drawn by a gesture of the hand.

11. The device as set forth in claim 5, wherein the pad is further provided with a load sensor which is transparent and can detect a stronger pressing pressure than the pressure sensor.

12. The device as set forth in claim 7, wherein a vein pattern is checked and then used for biometric authentication.

13. The device as set forth in claim 10, wherein the gesture of the hand comprises at least one of a motion of extending a flexed finger with a tip of the finger in contact with the pad, a motion of flexing an extended finger with a tip of the finger in contact with the pad, a motion of making a flip using two fingers with the fingers simultaneously in contact with the pad, a motion of directly drawing a character using a finger, and a double touch motion of bringing a tip of a finger into light contact with the pad twice, and a motion pattern consistent with the trajectory is registered in memory of the processor so that a manipulation instruction corresponding to a motion based on the trajectory can be output.

\* \* \* \* \*